March 24, 1959  H. C. QUIGLEY ET AL  2,879,314
FURNACE SEAL
Filed March 26, 1956
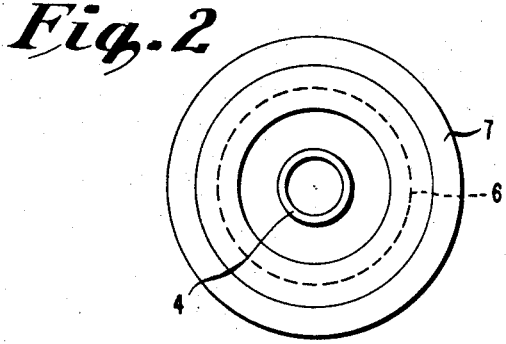
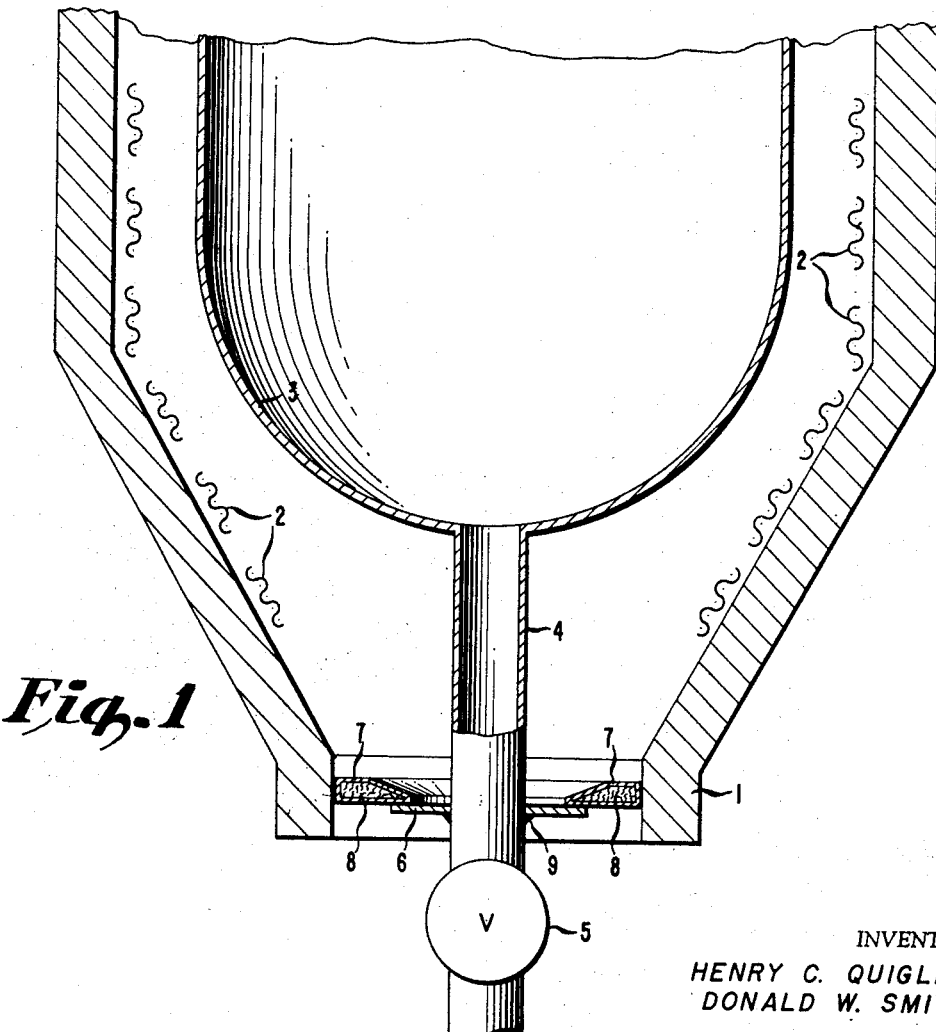
INVENTOR
HENRY C. QUIGLEY
DONALD W. SMITH
BY Francis J. Crowley
ATTORNEY

Header omitted

2,879,314

FURNACE SEAL

Henry C. Quigley, Washington, D.C., and Donald W. Smith, Wilmington, Del., assignors to E. I. du Pont de Nemours and Company, Wilmington, Del., a corporation of Delaware Application March 26, 1956, Serial No. 573,829

4 Claims. (Cl. 13—33)

This invention pertains to a bottom seal for a furnace containing a reaction vessel having a discharge conduit situated within an opening in the furnace bottom.

In many chemical operations, use is made of an electrically heated furnace adapted to receive a removable reaction vessel having a discharge conduit situated within an opening in the furnace bottom. In this type of furnace, the reactor is inserted by lowering until the annular flange in the upper portion of the vessel rests on the top rim of the furnace. The opening in the bottom of the furnace must be somewhat larger than the discharge conduit to permit easy insertion of the vessel and to allow space for thermal expansion, warping, etc. One disadvantage of this type of construction is that hot vapors from discharged materials find their way through this bottom space and damage the interior of the furnace and the outer wall of the reaction vessel.

An example of this problem occurs in the production of refractory metals, such as titanium. This metal is produced by the reduction of titanium tetrachloride with a reducing metal, such as magnesium, and the by-product salts formed during the process are discharged through the reactor conduit. Past experience has shown that vapors of the by-product salts and of the unreacted reducing metal find their way between the furnace opening and the drainpipe to corrode the electrical heating elements within the furnace and the exterior of the reaction vessel. It has also been found that liquid magnesium chloride, which is a by-product salt, tends to creep up the outside wall of the discharge drainpipe and cause further damage. Conventional sealing means are not adequate to prevent this because of the high temperature of the operation and the necessity for allowing space for movement of the discharge pipe.

It is an object of this invention to provide a means for preventing damage to the interior of a reaction furnace by the entry of materials discharged from the reactor. It is also an object to provide a novel sealing element in the bottom of a reaction furnace which will permit the ready removal of the reaction vessel therefrom.

These objects are accomplished by a seal for a furnace containing a reaction vessel having a discharge conduit situated within an opening in the furnace bottom. This seal comprises a collar fixed to the periphery of the conduit and having a flat upper surface; and as a second component, a larger centrally perforated upper member loosely encircling said conduit and situated in the furnace opening, the bottom of said upper member having a flat surface resting upon the upper surface of said collar and maintaining a sliding seal around the discharge conduit, said upper member conforming to the shape of the furnace opening and approximating the size of said opening.

The above-described assembly constitutes an adjustable sliding seal giving a close clearance between its outer edge and the walls of the furnace throat while permitting lateral movement of the bottom discharge pipe due to warping, thermal motion and swinging encountered during heating of the reaction vessel.

One embodiment of this invention is shown in the accompanying drawings. Figure 1 is a vertical section of the seal in a circular furnace. Figure 2 is a top plan of the seal of Fig. 1.

In Figure 1 there is shown the lower portion of an open bottom furnace shell 1 containing electric resistance elements 2. A suitable reaction vessel 3 made of steel or iron clad high-temperature alloy steel is mounted within this furnace, and at the vessel's bottom is a discharge conduit 4 which is connected to valve 5 for controlling the flow of material from the vessel. Valve 5 is not essential to the invention, and it could be replaced by such means as a trap. The seal upon which this invention is based comprises horizontal collar support 6 extending around the periphery of discharge conduit 4 and supporting the upper member or ring baffle 7. Upper member 7, of course, must be placed around the discharge pipe prior to the mounting of disc 6 and valve 5. It is usually secured to the discharge conduit by welding 9 which makes a leak proof connection. Upper member 7 serves as a closure for the bottom outlet of the furnace, and at the same time, its upper surface is a radiation shield to keep heat within the furnace. This radiation shield and interior insulation 8 maintain the lower surface of 7 below the melting point of such by-products as magnesium chloride when the apparatus is being used for the production of titanium. This temperature control, found in the preferred form of this apparatus, serves to prevent the magnesium chloride from remaining liquid so that it can creep around the movable seal and into the furnace.

The ring baffle 7 is a centrally perforated member having a smooth lower surface. In its preferred form, the member is hollow and filled with a refractory insulation as shown in Fig. 1. Such refractory insulations include mineral wool, alumina gel, silica gel and expanded vermiculite. The bottom surface is preferably flat, and the peripheral surface or side is preferably vertical. The contour of the top surface is not critical. It can be flat, sloping, or composed of many faces. The center hole is preferably circular. The periphery of this member is such that a fairly good fit is made with the furnace throat, the clearance being not more than 1 inch and preferably within the range of 1/16 to 1/4 inch. Flat washer shaped elements and thicker versions of this shape constitute a suitable form of construction. Also suitable is a disc having a relatively wide rim at its outer edge. The supporting collar 6 has an outer diameter at least sufficient to cover the center hole of the upper member at all times. However, this collar should never be so large that its normal lateral movements would be restricted by the furnace wall. The central aperture of the upper member is similarly larger than the drainpipe to permit the same normal movement. In a circular assembly, the extension of 6 beyond drainpipe 4 is usually slightly greater than the difference between the diameter of the aperture of the upper member 7 and the outside diameter of the drainpipe.

The drainpipe from the reactor is usually made of ordinary (low carbon) steel and the collar affixed thereto is preferably made of the same material. Since the collar will conduct considerable heat, it is preferred to use ordinary steel on the under side where the fume contact is greatest, and to have the upper surface of stainless steel for strength. While it is preferred to fix the collar to the conduit by welding, it could also be threaded, or driven, pressed, or shrink-fitted. The upper member 7 may be made of any ferrous metal, but it is preferably constructed of an alloy steel having resistance to surface oxidation in order to enhance heat reflection from its upper surface, the 300 series steels being satisfactory for this purpose. The hollow insulation filled modification is very satisfactory when made of thin stainless steel such as 304 stainless steel.

The preferred flat bottom of the upper member provides close but free sliding contact between it and the supporting collar. Such a protective seal has served to prolong the life of electric furnaces as well as reaction vessels used in the production of titanium metal. It has the further advantage that this closure can be assembled before placing the reactor in the furnace, thus permitting the movements of the reactor in and out of furnace with a minimum of manual labor in the dangerous location under the furnace.

We claim:

1. In a furnace including an outer member having walls and a bottom and a removable reaction vessel normally situated within said member, said reaction vessel having an elongated discharge conduit normally situated within an opening in the furnace bottom, the improvement which comprises a collar fixed to the outer periphery of the conduit and having a flat upper surface, a larger centrally perforated upper member having a bottom and loosely encircling said conduit and situated in the furnace opening, the bottom of said upper member having a flat surface resting upon the upper surface of said collar and maintaining a sliding seal around the discharge conduit, said upper member conforming to the shape of the furnace opening and approximating the size of said opening to give a close clearance between the outer edge of said upper member and the walls of the furnace.

2. The seal of claim 1 in which the collar is fixed to the conduit by a weld.

3. The seal of claim 1 in which the upper member is hollow.

4. The seal of claim 3 in which the hollow space contains refractory insulation.

References Cited in the file of this patent

UNITED STATES PATENTS

| | | |
|---|---|---|
| 360,144 | Cowles | Mar. 29, 1887 |
| 2,593,899 | Krug | Apr. 22, 1952 |
| 2,647,826 | Jordan | Aug. 4, 1953 |
| 2,768,074 | Stauffer | Oct. 23, 1956 |